United States Patent
Krasnov et al.

(10) Patent No.: US 8,003,167 B2
(45) Date of Patent: *Aug. 23, 2011

(54) METHOD OF MAKING HEAT TREATED COATED ARTICLE USING DIAMOND-LIKE CARBON (DLC) COATING AND PROTECTIVE FILM

(75) Inventors: Alexey Krasnov, Canton, MI (US); Rudolph Hugo Petrmichl, Ann Arbor, MI (US); Jiangping Wang, Novi, MI (US); Nestor P. Murphy, West Bloomfield, MI (US); Maximo Frati, Ypsilantl, MI (US); Jose Nunez-Regueiro, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 926 days.

This patent is subject to a terminal disclaimer.

(21) Appl. No.: 11/806,674

(22) Filed: Jun. 1, 2007

(65) Prior Publication Data

US 2008/0182032 A1 Jul. 31, 2008

Related U.S. Application Data

(63) Continuation-in-part of application No. 11/699,080, filed on Jan. 29, 2007.

(51) Int. Cl.
*C23C 16/00* (2006.01)
(52) U.S. Cl. ............. 427/249.7; 427/249.8; 427/249.14; 427/331; 427/372.2; 427/377
(58) Field of Classification Search ............... 427/372.2, 427/402
See application file for complete search history.

(56) References Cited

U.S. PATENT DOCUMENTS

| | | | |
|---|---|---|---|
| 4,715,879 A * | 12/1987 | Schmitte et al. | 65/60.2 |
| 5,073,450 A | 12/1991 | Nietering | |
| 5,135,808 A | 8/1992 | Kimock et al. | |

(Continued)

FOREIGN PATENT DOCUMENTS

WO WO 2005/021454 3/2005

(Continued)

OTHER PUBLICATIONS

U.S. Appl. No. 11/699,080, filed Jan. 29, 2007.

(Continued)

*Primary Examiner* — David Turocy
(74) *Attorney, Agent, or Firm* — Nixon & Vanderhye. P.C.

(57) ABSTRACT

There is provided a method of making a heat treated (HT) coated article to be used in shower door applications, window applications, or any other suitable applications where transparent coated articles are desired. The method may include heat treating a glass substrate coated with at least a layer of or including diamond-like carbon (DLC) or other type of carbon, with a protective film thereon. In certain example embodiments, the protective film may be of or include a layer of or including $SnO_x$ prior to HT. Optionally, a release layer of a material such as zinc oxide may be provided between the $SnO_x$ and the DLC. Following and/or during heat treatment the $SnO_x$ transforms into $SnO_y$ (y>x) so that stress is created due to the $SnO_x$ to $SnO_y$ transition. Then, during quenching, stress relief may occur which causes the layer to buckle, creating cracks which may act as liquid channels that permit the sacrificial film to be easily removed via washing or the like.

21 Claims, 4 Drawing Sheets

U.S. PATENT DOCUMENTS

| | | | |
|---|---|---|---|
| 5,229,194 | A * | 7/1993 | Lingle et al. .................. 428/216 |
| 5,470,661 | A | 11/1995 | Bailey et al. |
| 5,635,245 | A | 6/1997 | Kimock et al. |
| 5,838,530 | A | 11/1998 | Zhang |
| 5,858,477 | A | 1/1999 | Veerasamy et al. |
| 5,888,593 | A | 3/1999 | Petrmichl et al. |
| 5,900,342 | A | 5/1999 | Visser et al. |
| 6,002,208 | A | 12/1999 | Maishev et al. |
| 6,261,693 | B1 | 7/2001 | Veerasamy |
| 6,280,834 | B1 | 8/2001 | Veerasamy et al. |
| 6,284,377 | B1 | 9/2001 | Veerasamy |
| 6,303,225 | B1 | 10/2001 | Veerasamy |
| 6,303,226 | B2 | 10/2001 | Veerasamy |
| 6,312,808 | B1 | 11/2001 | Veerasamy et al. |
| 6,335,086 | B1 | 1/2002 | Veerasamy |
| 6,338,901 | B1 | 1/2002 | Veerasamy |
| 6,447,891 | B1 | 9/2002 | Veerasamy et al. |
| 6,461,731 | B1 | 10/2002 | Veerasamy et al. |
| 6,531,182 | B2 | 3/2003 | Veerasamy et al. |
| 6,592,992 | B2 | 7/2003 | Veerasamy |
| 6,592,993 | B2 | 7/2003 | Veerasamy |
| 6,827,977 | B2 | 12/2004 | Veerasamy |
| 6,921,579 | B2 | 7/2005 | O'Shaughnessy et al. |
| 7,060,322 | B2 | 6/2006 | Veerasamy |
| 7,067,175 | B2 | 6/2006 | Veerasamy |
| 7,150,849 | B2 | 12/2006 | Veerasamy |
| 7,507,442 | B2 | 3/2009 | Veerasamy |
| 7,622,161 | B2 | 11/2009 | Veerasamy |
| 2003/0118860 | A1 * | 6/2003 | O'Shaughnessy et al. ... 428/629 |
| 2003/0170464 | A1 * | 9/2003 | Veerasamy .................. 428/426 |
| 2004/0258890 | A1 * | 12/2004 | Miller et al. ................ 428/195.1 |
| 2004/0258926 | A1 | 12/2004 | Veerasamy |
| 2005/0048284 | A1 * | 3/2005 | Veerasamy .................. 428/408 |
| 2005/0095430 | A1 | 5/2005 | Veerasamy |
| 2005/0095431 | A1 | 5/2005 | Veerasamy |
| 2005/0191494 | A1 | 9/2005 | Veerasamy |
| 2006/0003545 | A1 | 1/2006 | Veerasamy |
| 2006/0057294 | A1 | 3/2006 | Veerasamy et al. |
| 2006/0166009 | A1 * | 7/2006 | Veerasamy .................. 428/433 |
| 2007/0231553 | A1 * | 10/2007 | Hartig et al. ................. 428/216 |
| 2008/0182123 | A1 | 7/2008 | Murphy et al. |

FOREIGN PATENT DOCUMENTS

WO    WO 2007/112229    10/2007

OTHER PUBLICATIONS

U.S. Appl. No. 11/798,920, filed May 17, 2007.

"Hybrid AC EL Structures with Thin Protective ZnO Film", Tsvetkova et al., Journal of Physics: Conference Series 113 (2008) pp. 1-4.

"Feasibility Study of RF Sputtered ZnO Film for Surface Micromachining", Bhatt et al., Surface & Coatings Technology, 198 (2005) pp. 304-308.

"Low-Emissivity Coating of Amorphous Diamond-Like Carbon/Ag-Alloy Multilayer on Glass" Chiba et al., Applied Surface Science 246 (2005) pp. 48-51.

* cited by examiner

METHOD OF MAKING HEAT TREATED COATED ARTICLE USING DIAMOND-LIKE CARBON (DLC) COATING AND PROTECTIVE FILM

This application is a continuation-in-part (CIP) of U.S. Ser. No. 11/699,080, filed Jan. 29, 2007, the entire disclosure of which is hereby incorporated herein by reference.

Certain embodiments of this invention relate to a method of making a heat treated (HT) coated article to be used in shower door applications, window applications, tabletop applications, or any other suitable applications. For example, certain embodiments of this invention relate to a method of making a coated article including a step of heat treating a glass substrate coated with at least a layer comprising diamond-like carbon (DLC) and an overlying sacrificial protective film thereon. In certain example embodiments, the protective film may be of or include an oxygen blocking or barrier layer for protecting the DLC during heat treatment (e.g., thermal tempering). Optionally, a release layer may be provided between the DLC and the barrier layer. Following and/or during heat treatment (e.g., thermal tempering, or the like) the protective film may be entirely or partially removed by washing or the like. Other embodiments of this invention relate to the pre-HT coated article, or the post-HT coated article.

BACKGROUND OF THE INVENTION

Coated articles such as transparent shower doors and IG window units are often heat treated (HT), such as being thermally tempered, for safety and/or strengthening purposes. For example, coated glass substrates for use in shower door and/or window units are often heat treated at a high temperature(s) (e.g., at least about 580 degrees C., more typically from about 600-650 degrees C.) for purposes of tempering.

Diamond-like carbon (DLC) is sometimes known for its scratch resistant properties. For example, different types of DLC are discussed in the following U.S. Pat. Nos. 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and 5,470,661, all of which are hereby incorporated herein by reference.

It would sometimes be desirable to provide a window unit or other glass article with a protective coating including DLC in order to protect it from scratches and the like. Unfortunately, DLC tends to oxidize and burn off at temperatures of from approximately 380 to 400 degrees C., as the heat treatment is typically conducted in an atmosphere including oxygen. Thus, it will be appreciated that DLC as a protective overcoat cannot withstand heat treatments (HT) such as thermal tempering, heat strengthening, heat bending or the like at the extremely high temperatures described above which are often required in the manufacture of vehicle windows, IG window units, glass table tops, shower doors, and/or the like.

Accordingly, those skilled in the art will appreciate that a need in the art exists for a method of providing heat treated (HT) coated articles with a protective coating (one or more layers) comprising DLC. A need for corresponding coated articles, both heat treated and pre-HT, also exists.

BRIEF SUMMARY OF EXAMPLES OF INVENTION

Certain example embodiments of this invention relate to a method of making a heat treated (HT) coated article to be used in shower door applications, window applications, tabletop applications, or any other suitable application. For example, certain embodiments of this invention relate to a method of making a coated article including a step of heat treating a glass substrate coated with at least a layer comprising diamond-like carbon (DLC) and an overlying sacrificial protective film thereon. In certain example embodiments, the protective or sacrificial film may be of or include a layer of or including $SnO_x$ (where x is from about 0.75 to 1.5, more preferably from about 0.8 to 1.3, and even more preferably from about 0.9 to 1.2, with an example being about 1). Optionally, a release layer of a material such as zinc oxide may be provided between the $SnO_x$ and the DLC.

Following and/or during heat treatment (e.g., thermal tempering, or the like) at least some of and preferably much of the $SnO_x$ transforms into $SnO_y$ (where y is from about 1.6 to 2.2, more preferably from about 1.7 to 2.1, and even more preferably from about 1.9 to 2.05, with an example being about 2). Due to or after exposure to the heat treating temperatures, the tin oxide of the sacrificial film oxidizes and the additional oxygen atoms arriving from the ambient air increases the volume of the material of the sacrificial film, so that stress is created due to the $SnO_x$ to $SnO_y$ transition in the sacrificial film. Then, during glass quenching (e.g., part of the tempering process), stress relief may occur which causes the layer to buckle, creating numerous deep cracks on its surface which may act as water or liquid channels that permit the sacrificial film to be easily removed (partially or entirely) from the DLC and glass substrate via washing or the like.

In certain example embodiments of this invention, there is provided a method of making a heat treated coated article, the method comprising: providing a glass substrate; forming at least one layer comprising diamond-like carbon (DLC) on the glass substrate; forming a protective film on the glass substrate over at least the layer comprising DLC, the protective film including a layer comprising $SnO_x$ (x is from about 0.75 to 1.5); heat treating the glass substrate with the layer comprising DLC and the protective film thereon so that during the heat treating the protective film prevents significant burnoff of the layer comprising DLC, wherein the heat treating comprises heating the glass substrate to temperature(s) sufficient for thermal tempering, heat strengthening, and/or heat bending; wherein during the heat treating the layer comprising $SnO_x$ transforms into a layer comprising $SnO_y$ (y is from about 1.6 to 2.2), wherein y is greater than x; and exposing the protective film to a release liquid and removing at least part of the protective film after said heat treating.

In other example embodiments of this invention, there is provided a method of making a heat treated coated article, the method comprising: providing a glass substrate; forming at least one layer comprising carbon on the glass substrate; forming a protective film on the glass substrate over at least the layer comprising carbon, the protective film including a layer comprising $MO_x$ (x is from about 0.75 to 1.5, and M is a metal); heat treating the glass substrate with the layer comprising carbon and the protective film thereon so that during the heat treating the protective film prevents significant burnoff of the layer comprising carbon, wherein the heat treating comprises heating the glass substrate to temperature(s) sufficient for thermal tempering, heat strengthening, and/or heat bending; wherein during the heat treating the layer comprising $MO_x$ transforms into a layer comprising $MO_y$ (y is from about 1.6 to 2.2), wherein y is greater than x; and exposing the protective film to a release liquid and removing at least part of the protective film after said heat treating. Metal M may be Sn (tin) or another suitable metal.

BRIEF DESCRIPTION OF THE DRAWINGS

FIG. 4 is a photograph of cracks formed in the sacrificial film caused by stress relief may occur due to quenching or the like, such crack(s) may act as water or liquid channels that permit the sacrificial film to be easily removed (partially or entirely) from the DLC and glass substrate via washing or the like.

DETAILED DESCRIPTION OF EXAMPLE EMBODIMENTS OF THE INVENTION

Figure 1:
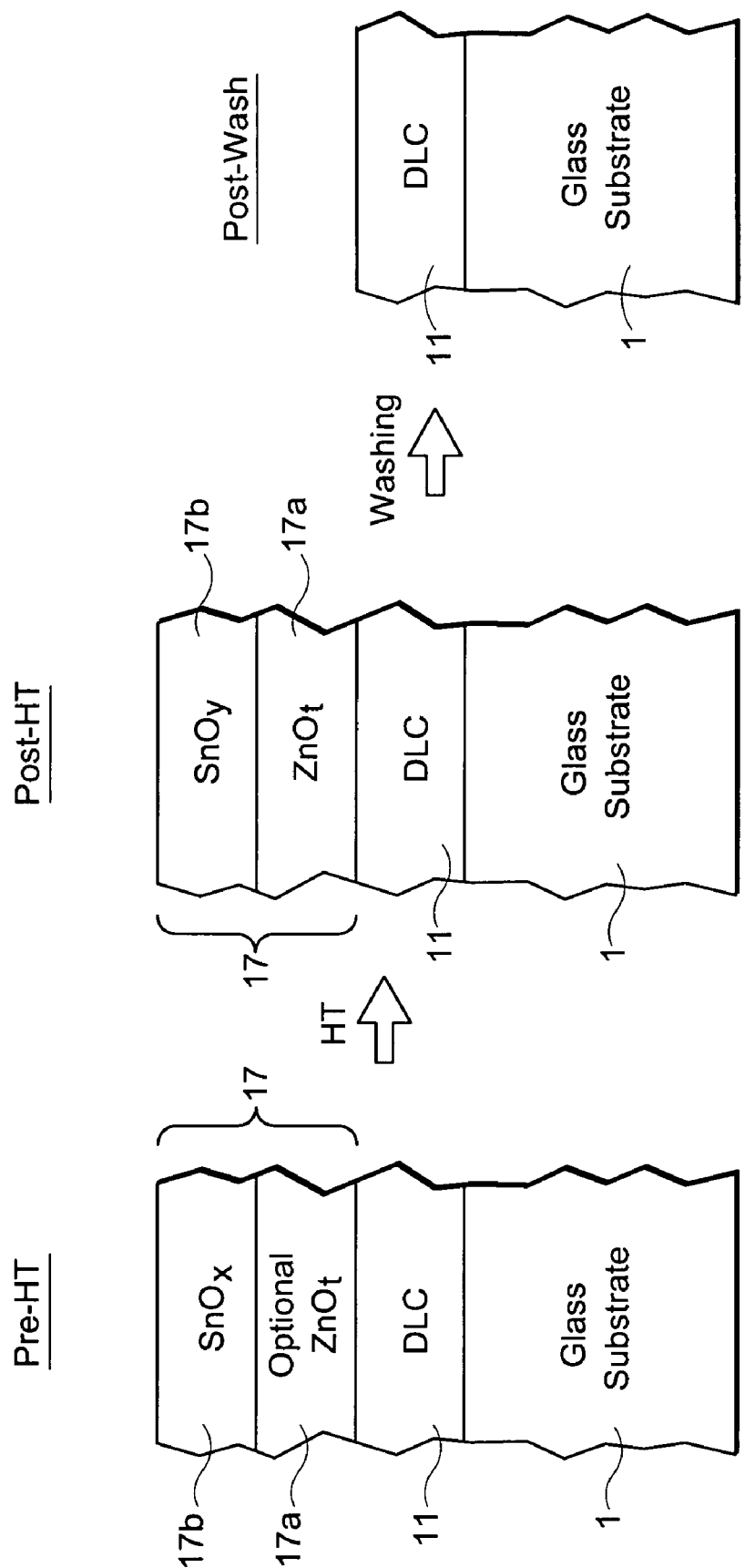
FIG. 1 is a schematic cross sectional view of a coated article, prior to and following heat treatment and washing, according to an example embodiment of this invention.

Referring now more particularly to the accompanying drawings in which like reference numerals indicate like parts throughout the several views.

Certain example embodiments of this invention relate to methods of making coated articles that may use heat treatment (HT), wherein the coated article includes a coating (one or more layers) including diamond-like carbon (DLC). In certain instances, the HT may involve heating a supporting glass substrate, with the DLC thereon, to or in a temperature(s) of from 550 to 800 degrees C., more preferably from 580 to 800 degrees C. (which is well above the burn-off temperature of DLC). In particular, certain example embodiments of this invention relate to a technique for allowing the DLC to withstand such HT without significantly burning off during the same. In certain embodiments, a sacrificial protective film is formed on the glass substrate over the DLC so as to reduce the likelihood of the DLC burning off during HT. Thus, the majority (if not all) of the DLC remains on the glass substrate, and does not burn off, during the HT. Following HT, the sacrificial protective film (which may include one or more layers) may or may not be removed in different embodiments of this invention.

In certain example embodiments, the protective or sacrificial film may be of or include an oxygen blocking or barrier layer 17b of or including $SnO_x$ (where x is from about 0.75 to 1.5, more preferably from about 0.8 to 1.3, and even more preferably from about 0.9 to 1.2, with an example being about 1). The tin oxide based film 17b may be amorphous, crystalline, or a mixture thereof, in different example embodiments of this invention, and may be deposited in any suitable manner (e.g., by pyrolysis, sputtering, or other suitable technique). Optionally, a release layer 17a of a material such as zinc oxide may be provided between the $SnO_x$ and the DLC. The example optional underlayer 17a of the sacrificial film 17 may be of a softer material (e.g., oxide of Zn, such as a suboxide thereof) than the film 17b, with the underlayer 17a facilitating the film 17 washing off while maintaining its integrity during heat treating. An example advantage of using distinct and different oxygen-blocking and release layers in film 17 is that each layer (17a and 17b) can be optimized for its intended function. Consequently, the optimized performance of the film 17 may be improved and it can be made thinner if desired. In certain example embodiments, following heat treatment (HT) the DLC inclusive layer 11 protects against abrasion and corrosion, and against adhesion of minerals in hard water (e.g., has good hard water cleanability).

In certain example embodiments, the total thickness of the entire sacrificial film 17 (including both layers 17a and 17b, or possibly only film 17b when layer 17a is omitted) is from about 100 to 20,000 Å, more preferably from about 5,000 to 15,000 Å, even more preferably from about 5,000 to 11,000 Å.

Following and/or during heat treatment (e.g., thermal tempering, or the like), in sacrificial layer 17b at least some of and preferably much of the $SnO_x$ transforms into $SnO_y$ (where y is from about 1.6 to 2.2, more preferably from about 1.7 to 2.1, and even more preferably from about 1.9 to 2.05, with an example being about 2). Due to or after exposure to the heat treating temperatures, the tin oxide of the sacrificial film 17b oxidizes and the additional oxygen atoms arriving from the ambient air increases the volume of the material of the sacrificial film 17b, so that stress is created due to the $SnO_x$ to $SnO_y$ transition in the sacrificial film 17b. Then, during thermal quenching (e.g., part of the glass tempering process involving cooling with cold air or the like), stress relief may occur which causes the layer 17b (and optionally 17a) to buckle, creating numerous deep cracks on its surface which may act as water or liquid channels that permit the sacrificial film 17b (and optionally 17a) to be easily removed (partially or entirely) from the DLC 11 and glass substrate 1 via washing or the like.

Figure 4:
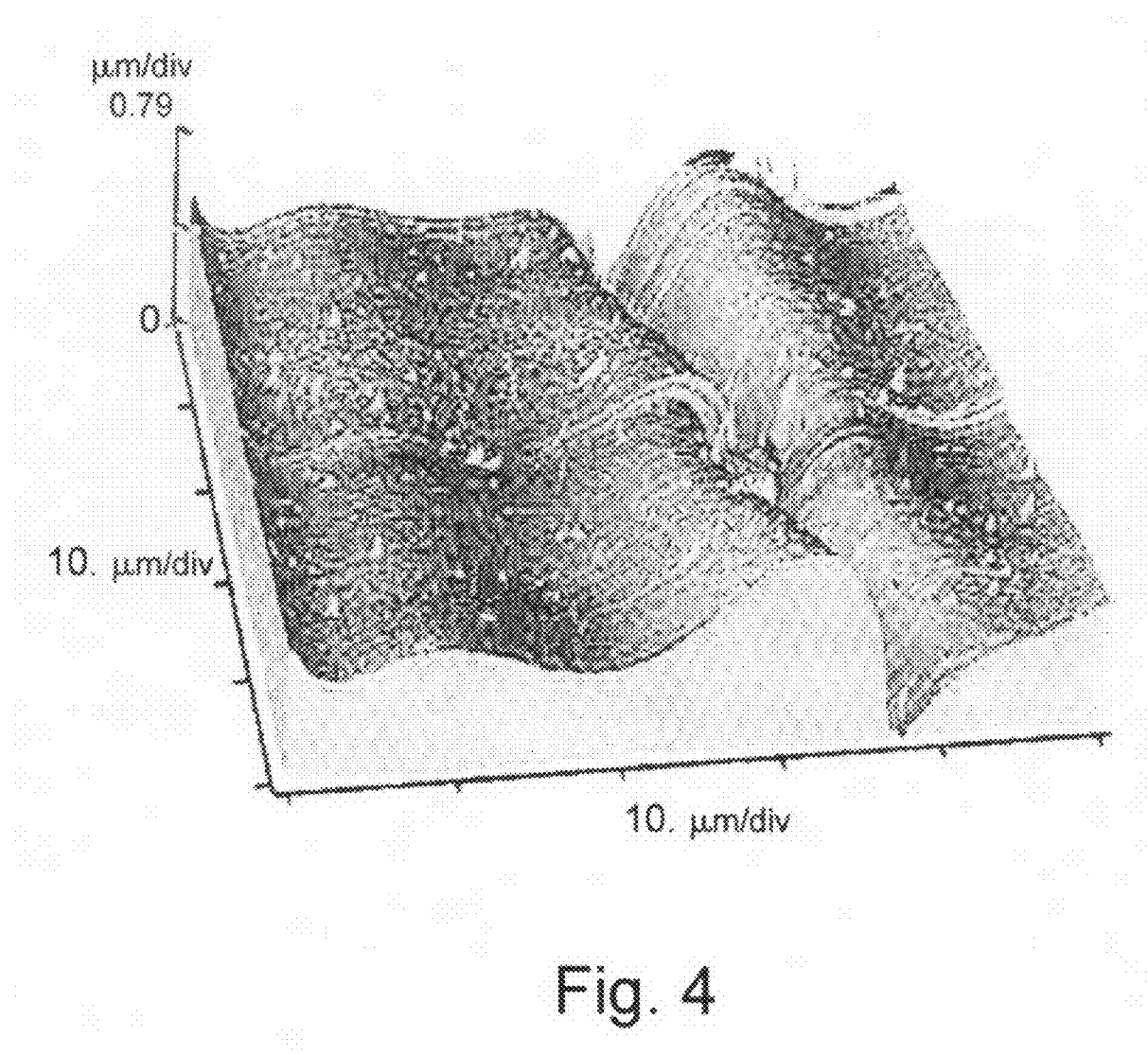

Thus, it will be appreciated that the material (e.g., tin oxide) chosen for the sacrificial film 17b is chosen in such a way as to protect the underlying DLC 11 from oxidation during high-temperature heat treating (e.g., one part of thermal tempering) and then to buckle during quenching by cold air and/or liquid (e.g., a subsequent part of thermal tempering). The material of choice (e.g., tin oxide) has monoxide (SnO) and dioxide ($SnO_2$) states, with the transition therebetween due to tempering causing formation of substantial stress in the film, which is relieved during the quenching thereby causing the cracking/buckling. When tin oxide is used for film 17b, it may or may not be doped with other material(s) such as Sb, F, and/or the like. An example crack in the post-HT and post-quenching film 17b is shown in FIG. 4. It will be appreciated that sacrificial film 17a is preferably substoichiometric prior to HT, and its level of oxidation is chosen in such a way as to substantially maintain an optimum balance between the protective properties of the film 17b and its readiness to be removed during washing following HT.

FIG. 1 is a schematic cross sectional view of a coated article, before and after heat treatment, according to an example embodiment of this invention. Typically, the coated article on the left side of FIG. 1 exists during a stage of manufacture prior to heat treatment (HT), but may also exist post-HT in certain instances. The coated article shown at the left side of FIG. 1 includes glass substrate 1, DLC inclusive layer 11, and sacrificial protective film 17 which may include one or more layers. In certain example embodiments, the protective film 17 includes first and second layers 17a and 17b. Glass substrate 1 is typically of or includes soda-lime-silica glass, although other types of glass may be used in certain instances.

Layers 17a and/or 17b may be deposited on the glass substrate via sputtering, pyrolysis, or any other suitable technique. For example, as one non-limiting example, optional zinc oxide based buffer layer 17a may be sputter-deposited using 3 to 15 (e.g., 10) sccm/kW (regarding content of oxygen gas flow power), whereas tin oxide based layer 17b may be sputter-deposited using an oxygen to argon gas ratio of from about 0.1 to 1.0, more preferably from about 0.5 to 1.0, and most preferably from about 0.5 to 0.8, and oxygen power of from about 20-60 sccm/kW. Pressure may be from about 0.5 to 8 mTorr in deposition conditions for layer 17a and/or 17b in certain example embodiments.

Note that zinc oxide layer 17a may be doped with other materials such as Al, N, Zr, Ni, Fe, Cr, Ti, Mg, mixtures thereof, or the like, in certain example embodiments of this invention. Also, layer 17b may be of or including $SnSbO_x$ instead of $SnO_x$ in certain example embodiments of this invention, with the same x and y values applying as discussed herein. In certain example embodiments of this invention, oxygen barrier layer 17b may include from about 0-12% Sb, sometimes from about 0.5 to 10% Sb, possibly from about 1-8% Sb, and still more possibly from about 2-7% Sb (the remainder of the layer may be made up of tin oxide or other metal oxide in different example instances).

DLC inclusive layer 11 may be from about 5 to 1,000 angstroms (Å) thick in certain example embodiments of this invention, more preferably from 10-300 Å thick, and most preferably from 20 to 65 Å thick, possibly from about 25-50 Å thick, with an example thickness being about 30 angstroms. In certain example embodiments of this invention, DLC layer 11 may have an average hardness of at least about 10 GPa, more preferably at least about 20 GPa, and most preferably from about 20-90 GPa. Such hardness renders layer(s) 11 resistant to scratching, certain solvents, and/or the like. Layer 11 may, in certain example embodiments, be of or include a special type of DLC known as highly tetrahedral amorphous carbon (t-aC), and may be hydrogenated (t-aC:H) in certain embodiments. In certain hydrogenated embodiments, the t-aC type or any other suitable type of DLC may include from 1 to 30% hydrogen, more preferably from 5-20% H, and most preferably from 10-20% H. This t-aC type of DLC includes more $sp^3$ carbon-carbon (C—C) bonds than $sp^2$ carbon-carbon (C—C) bonds. In certain example embodiments, at least about 30% or 50% of the carbon-carbon bonds in DLC layer 11 may be $sp^3$ carbon-carbon (C—C) bonds, more preferably at least about 60% of the carbon-carbon bonds in the layer 11 may be $sp^3$ carbon-carbon (C—C) bonds, and most preferably at least about 70% of the carbon-carbon bonds in the layer 11 may be $sp^3$ carbon-carbon (C—C) bonds. In certain example embodiments of this invention, the DLC may have an average density of at least about 2.4 $gm/cm^3$, more preferably at least about 2.7 $gm/cm^3$. Example linear ion beam sources that may be used to deposit DLC inclusive layer 11 on substrate 1 include any of those in any of U.S. Pat. Nos. 6,261,693, 6,002,208, 6,335,086, or 6,303,225 (all incorporated herein by reference). When using an ion beam source to deposit layer(s) 11, hydrocarbon feedstock gas(es) (e.g., $C_2H_2$), HMDSO, or any other suitable gas, may be used in the ion beam source in order to cause the source to emit an ion beam toward substrate 1 for forming layer(s) 11. It is noted that the hardness and/or density of layer(s) 11 may be adjusted by varying the ion energy of the depositing apparatus.

DLC layer 11 allows the coated article to be more scratch resistant than if the DLC 11 were not provided. It is noted that while layer 11 is on glass substrate 1 in certain embodiments of this invention, additional layer(s) may or may not be under layer 11 between the substrate 1 and layer 11 in certain example embodiments of this invention. Thus, the phrase "on the substrate" as used herein is not limited to being in direct contact with the substrate as other layer(s) may still be provided therebetween.

For example and without limitation, the layer 11 of or including DLC may be any of the DLC inclusive layers of any of U.S. Pat. Nos. 6,592,993; 6,592,992; 6,531,182; 6,461,731; 6,447,891; 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; or 5,470,661 (all of these patents hereby being incorporated herein by reference), or alternatively may be any other suitable type of DLC inclusive layer. DLC inclusive layer 11 may be hydrophobic (high contact angle), hydrophilic (low contact angle), or neither, in different embodiments of this invention. The DLC 11 may or may not include from about 5-30% Si, more preferably from about 5-25% Si, and possibly from about 10-20% Si in certain example embodiments of this invention. Hydrogen may also be provided in the DLC in certain instances.

Sacrificial protective film 17, of one or more layers, is provided in order to protect DLC layer 11 during HT. If film 17 were not provided, the DLC 11 would significantly oxidize during HT and burn off, thereby rendering the final product defenseless against scratching. However, the presence of sacrificial protective film 17 prevents or reduces the amount of oxygen which can reach the DLC 11 during HT from the surrounding atmosphere, thereby preventing the DLC from significantly oxidizing during HT. As a result, after HT, the DLC inclusive layer 11 remains on the glass substrate 1 in order to provide scratch resistance and/or the like. In certain example embodiments, the protective film 17 includes both an oxygen blocking or barrier layer 17b, and a release layer 17a.

In the FIG. 1 example embodiment of this invention, the protective film 17 includes a first zinc inclusive release layer 17a and a second tin oxide inclusive oxygen blocking and/or barrier layer 17b. The first zinc inclusive layer 17a may be metallic, substantially metallic, or substoichiometric zinc oxide in different example embodiments of this invention; whereas the second tin oxide inclusive layer 17b may be of or including tin oxide as discussed above in certain example embodiments of this invention. In certain example embodiments, layers 17a and 17b are both substoichiometric. Thus, optional layer 17a is able to function as a release layer whereas layer 17b is able to function as an oxygen blocking or barrier layer. An oxygen "blocking" or "barrier" layer means that the layer blocks significant amounts of oxygen from reaching the DLC during HT. It is noted that while layer 17b is of or include tin oxide in certain example embodiments, it is possible to use a different material (e.g., different metal M oxide) for layer 17b that is capable of existing in different stoichiometric states such as having a monoxide form and a dioxide form, so that the transition from one to the other due to HT can cause the formation of stress discussed herein.

In certain example embodiments of this invention, layer 17a may be of or include $ZnO_t$ and layer 17b may be of or include $SnO_x$ (x may be greater than or equal to t in certain example embodiments). In certain example embodiments of this invention, t is from about 0 to 0.9, more preferably from about 0.1 to 0.9, even more preferably from about 0.1 to 0.8, and possibly from about 0.1 to 0.7. Meanwhile, in certain example embodiments, x may be from about 0.75 to 1.5, more preferably from about 0.8 to 1.3, and even more preferably from about 0.9 to 1.2, with an example being about 1.

Advantageously, it has been found that the use of substoichiometric zinc oxide layer 17a surprisingly permits more efficient and easier removal of the protective film 17 during and/or following heat treatment (HT). In other words, optional layer 17a may function as at least a release layer. The different materials and compositions of zinc oxide inclusive layer 17a and tin oxide inclusive barrier layer 17b are used to cause different stresses in layers 17a and 17b, which stresses are manipulated so as to allow the film 17 to be more easily removed during and/or following HT.

Following and/or during heat treatment (e.g., thermal tempering, or the like), in sacrificial layer 17b at least some of and preferably much of the $SnO_x$ transforms into $SnO_y$ so that y is greater than x (e.g., where y is from about 1.6 to 2.2, more preferably from about 1.7 to 2.1, and even more preferably from about 1.9 to 2.05, with an example being about 2). See the middle portion of FIG. 1 in this respect, which is after HT. Due to or after exposure to the heat treating temperatures, the tin oxide of the sacrificial film 17b oxidizes and the additional oxygen atoms arriving from the ambient air increases the volume of the material of the sacrificial film 17b, so that stress is created due to the $SnO_x$ to $SnO_y$ transition in the sacrificial film 17b. Then, during thermal quenching (e.g., part of the glass tempering process involving cooling with cold air or the like), stress relief may occur which causes the layer 17b (and optionally 17a) to buckle, creating numerous deep cracks on its surface which may act as water or liquid channels that permit the sacrificial film 17b (and optionally 17a) to be easily removed (partially or entirely) from the DLC 11 and glass substrate 1 via washing or the like. An example crack in layer 17b is shown in FIG. 4.

Following HT, zinc oxide based layer 17a is more metallic than is $SnO_y$ based layer 17b. The more metallic zinc oxide based layer 17a may be considered a release layer for allowing the film 17 to be easily removed from the DLC or substrate during and/or after HT due to its reduced or no oxygen content, whereas the less metallic (and more oxided) tin oxide based layer 17b may be considered an oxygen blocking or barrier layer that reduces or prevents the DLC from burning off and/or oxidizing during HT. Zinc oxide is an advantageous material for optional layer 17a because it can be easily removed (e.g., using water and/or vinegar) during and/or following HT in a non-toxic manner. Moreover, tin oxide and zinc oxide are also advantageous for use in protective film 17 because the Sn and Zn in film 17 may act as a getter for oxygen during HT thereby preventing or reducing the likelihood of the DLC burning off during such HT. It is noted that upper layer 17b may partially burn off during HT in certain example embodiments of this invention.

Following the quenching, the film 17 may be washed off using water and/or vinegar, or other suitable liquid, with the resulting product being shown as including the glass substrate 1 and DLC based layer 11 as shown at the right-hand portion of FIG. 1.

Figure 2:
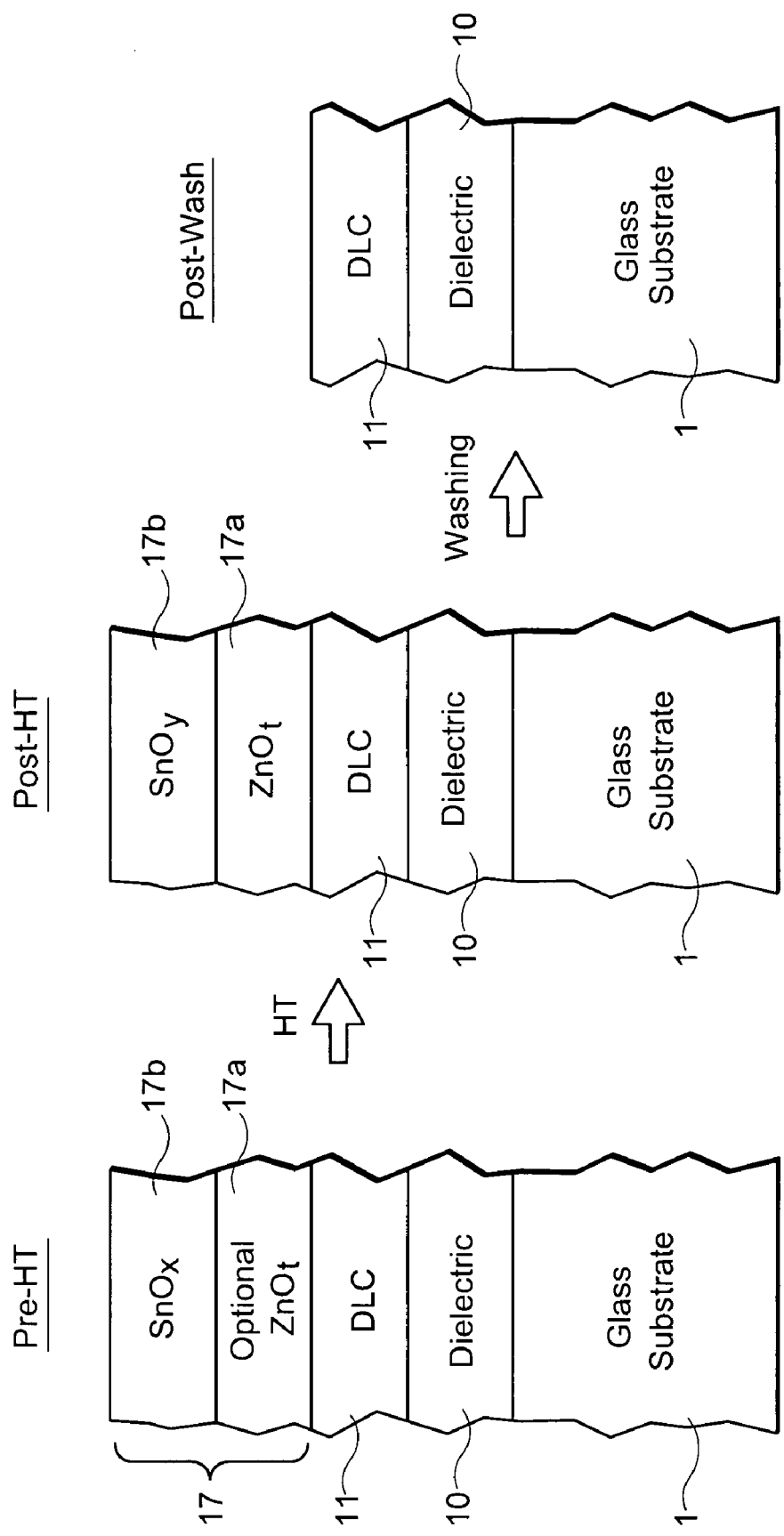
FIG. 2 is a schematic cross sectional view of a coated article, prior to and following heat treatment and washing, according to another example embodiment of this invention.

FIG. 2 illustrates another example embodiment of this invention. The FIG. 2 embodiment is the same as the FIG. 1 embodiment discussed above, except that in the FIG. 2 embodiment a barrier layer 10 is provided between the glass substrate 1 and the DLC inclusive layer 11. Barrier layer 10 may be a dielectric in certain example embodiments of this invention. Optional barrier layer 10 is for preventing or reducing oxygen and/or sodium (Na) from migrating from the glass 1 into the DLC 11 during HT. In this respect, such an optional barrier layer 10 may improve the overall optical characteristics of the coated article post-HT. Barrier layer 10 may be of or include silicon oxide, silicon nitride, silicon oxynitride, and/or the like, although other barrier materials may also be used. Barrier layer(s) 10 is formed on the glass substrate 1 via sputtering, or via any other suitable technique. Barrier layer 10 may be from about 10 to 1,000 Å thick in certain example embodiments, more preferably from 50 to 500 Å thick, and most preferably from 50 to 200 Å thick. It is noted that a barrier layer(s) 10 may also be provided in other example embodiments of this invention, for instance in the FIG. 3 embodiment between the DLC 11 and the glass substrate 1.

Figure 3:
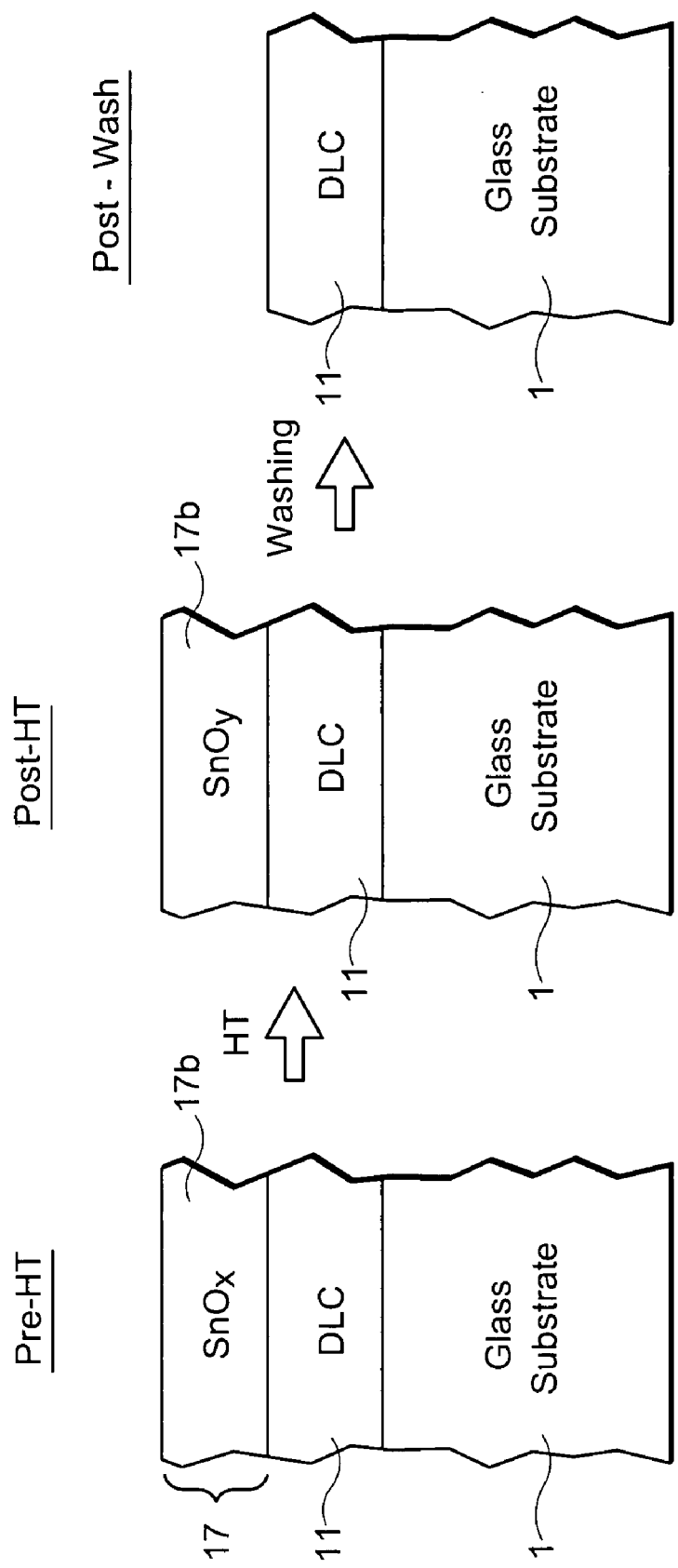
FIG. 3 is a schematic cross sectional view of a coated article, prior to and following heat treatment and washing, according to yet another example embodiment of this invention.

FIG. 3 illustrates another example embodiment of this invention. The FIG. 3 embodiment is the same as the FIG. 1 embodiment (or even the FIG. 2 embodiment if barrier layer 10 is used, which may be the case in the FIG. 3 embodiment), except that in the FIG. 3 embodiment the release layer 17a is omitted.

An example process of manufacturing a coated article will now be described, with reference to FIGS. 1-3. Initially, glass substrate 1 is provided, and at least one barrier layer 10 (e.g., silicon oxide, silicon nitride, silicon oxynitride, or the like) may optionally be sputtered on a surface thereof. Optionally, a multi-layer solar control coating (not shown) may be deposited (e.g., via sputtering) on the surface of the glass substrate 1 opposite the barrier layer 10. At least one layer 11 of or including DLC is deposited (e.g., via ion beam deposition) on the glass substrate 1, over at least the optional barrier layer 10 if present. Then, protective film 17, e.g., including layers 17a and 17b (or optionally just layer 17b), is deposited on the substrate 1 over the DLC inclusive layer 11. Protective film 17 may be deposited via sputtering, CVD, ion beam deposition, pyrolysis, or any other suitable technique. Optionally, a thin protective layer comprising DLC, silicon nitride, aluminum nitride, or silicon aluminum nitride (not shown), may be provided over sacrificial film 17 prior to HT, for durability and/or oxygen barrier purposes.

As shown in FIGS. 1-3, the glass substrate 1 with films 10 (optional), 11 and 17 thereon is then heat treated (HT) for purposes of thermal tempering, heat bending, heat strengthening, and/or the like. At least part of this HT may be conducted, for example, in an atmosphere including oxygen as known in the art at temperature(s) of from 550 to 800 degrees C., more preferably from 580 to 800 degrees C. (i.e., temperature(s) above the burn-off temperature of DLC). The HT may last for at least one minute, more preferably from 1-10 minutes, in certain example non-limiting embodiments of this invention. During HT, the presence of protective film 17 protects DLC inclusive layer 11 from the HT and prevents layer 11 from significantly oxidizing and/or burning off due to significant oxidation during the HT. While in some instances some of layer 11 may burn off during HT, the majority if not all of DLC inclusive layer 11 remains on the substrate 1 even after the HT due to the presence of sacrificial protective film 17.

A significant advantage associated with using tin oxide and/or zinc oxide in film 17 is its ease of removal after HT. Protective layers such as silicon nitride are sometime undesirable since they require complex etching in order to remove the same after HT. On the other hand, it has been found that when film 17 is made of zinc, zinc oxide and/or tin oxide, soluble in vinegar and/or water (possibly only water with no vinegar required in certain preferred embodiments), the application of vinegar and/or water allows portions of film 17 remaining after HT to be easily removed in a non-toxic manner. Again, in certain example embodiments, it is possible to remove the film 17 with only water and/or vinegar in certain instances, which is advantageous from a cost and processing point of view. In certain example instances, rubbing with such liquids may be especially beneficial in removing film 17 after HT when the coated article is still warm therefrom (e.g., when the film 17 is from about 80-200 degrees C., more preferably from about 100-180 degrees C.; although the removal of film 17 may also take place at room temperature in certain example embodiments).

After film 17 has been removed, the remaining coated article is shown at the right side of FIGS. 1-3, and includes an outer layer comprising scratch resistant DLC. The aforesaid processes are advantageous in that they provide a technique for allowing a coated article including a protective DLC inclusive layer 11 to be heat treated without the DLC layer 11 burning off during such HT. In other words, it becomes possible to provide a protective DLC inclusive layer 11 on a heat treated (e.g., thermally tempered) product in a commercially acceptable manner.

While zinc or zinc oxide (which may or may not be doped with other material(s) such as Al or the like) is used for the release layer 17a in certain example embodiments, other materials may instead be used for layer 17a. For instance, the release layer 17a may be or any suitable material that dissolves or readily reacts with water, vinegar, or bleach. Release layer 17a may have a melting point (or dissociation temperature) above 580 or 600 degrees C. in certain example embodiments. The release layer 17a may be of or include oxides, suboxides, nitrides and/or subnitrides of boron, titanium boride, magnesium, zinc, and mixtures thereof. Example materials for the release layer 17a in certain example embodiments are suboxides of zinc, magnesium and/or titanium boride. Note that the term "oxide" as used herein is broad enough to encompass suboxides. In certain example embodiments, release layer 17a is more dissolvable than is layer 17b in water, vinegar, bleach and/or the like. Moreover, in certain example embodiments, oxygen barrier layer 17b is more of a barrier to oxygen and/or is harder than is release layer 17a. Exemplary coatings may produce high quality post-HT and post-release DLC, with good scratch resistance and good hard water cleanability.

According to certain example embodiments of this invention, coated articles herein lose no more than about 15% of their visible transmission due to HT, more preferably no more than about 10%. Moreover, monolithic coated articles herein preferably have a visible transmission after HT of at least about 50%, more preferably of at least about 60 or 75%. It is also noted that in any of the embodiments discussed above, it may be possible to provide an optional scratch resistant layer (e.g., of or including SiC or DLC—not shown) over the layer 17b. Also, while layer 11 is of or includes DLC in certain example embodiments of this invention, it is possible that layer 11 may be of a different scratch resistant material such as silicon carbide, other form of carbon, or the like in alternative example embodiments of this invention.

It is also possible for layer 17a and layer 17b to both be of or include zinc oxide in certain example embodiments of this invention. An example stack comprises a 800 nm zinc oxide based gettering layer 17a deposited using an oxygen flow rate of approximately 10 ml/kW on top of the DLC 11 followed by a second 200 nm zinc oxide based protection top layer 17b deposited using an oxygen flow rate of approximately 12 ml/kW. It has also been determined that replacing the top layer 17b with a layer deposited using an oxygen flow rate of approximately 18 ml/kW provides protection during longer tempering durations. It has also been determined that replacing the top layer 17b with a layer deposited using an oxygen flow rate of approximately 18 ml/kW followed with another layer of DLC (not shown) provides improved abrasion resistance. During tempering, the rate of oxidation of the ZnO layer 17b and the tendency for resulting oxide film to protect the more metallic layer 17a from further oxidation are related to the relative volumes of the oxide and metal.

The Pilling-Bedworth ratio, (P-B ratio) of a metal oxide (MOx) is defined as the ratio of the volume of the metal oxide to the metal volume. For films with a ratio less than one the resulting metal oxide (e.g., zinc oxide, tin oxide, or the like) tends to be porous and non-protective because it cannot cover the whole metal surface; films with a ratio greater than two result in large compressive stress likely to exist in the metal oxide, leading to buckling and crazing. A ZnO film for example, which has a P-B ratio of approximately 1.58 when going from a metal to an oxide film and a ratio of 1.26 when going from a sub-oxide to an oxide film, when tempered expands providing a denser uniform protection layer. The film thickness of the above stack increased 5% due to it being tempered at 600° C. for 5 minutes indicating an increase in volume. Other metal oxides may also be used. In certain example embodiments, the $MO_x$ layer(s) 17a and/or 17b preferably has a P-B ratio of from about 1.1 to 1.8, more preferably from about 1.2 to 1.65.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of making a heat treated coated article, the method comprising:
   providing a glass substrate;
   forming at least a layer comprising carbon on the glass substrate;
   forming a protective film on the glass substrate over at least the layer comprising carbon, the protective film including a layer comprising $SnO_x$, where x is from about 0.75 to 1.5, and a layer comprising substoichiometric zinc oxide $ZnO_t$ where t is from 0.1 to 0.8, wherein in the protective film the layer comprising zinc oxide $ZnO_t$ is located between and contacting the layer comprising carbon and the layer comprising $SnO_x$;
   heat treating the glass substrate with the layer comprising carbon and the protective film thereon so that during the heat treating the protective film prevents significant burnoff of the layer comprising carbon, wherein the heat treating comprises heating the glass substrate to temperature(s) sufficient for thermal tempering, heat strengthening, and/or heat bending;
   wherein during the heat treating the layer comprising $SnO_x$ transforms into a layer comprising $SnO_y$, where y is from about 1.6 to 2.2, wherein y is greater than x; and
   exposing the protective film to a release liquid and removing at least part of the protective film after said heat treating.

2. The method of claim 1, further comprising quenching the glass substrate with the layer comprising carbon and the protective film thereon after said heat treating, said quenching comprising using at least cool air and/or cool liquid to quench the glass substrate.

3. The method of claim 1, wherein x is from about 0.8 to 1.3.

4. The method of claim 1, wherein x is from about 0.9 to 1.2.

5. A method of making a heat treated coated article, the method comprising:
   having a coated article comprising a glass substrate, at least one layer comprising diamond-like carbon (DLC) on the glass substrate, a protective film on the glass substrate over at least the layer comprising DLC, the protective film including a layer comprising $SnO_x$ where x is from about 0.75 to 1.5, and a layer comprising substoichiometric zinc oxide $ZnO_t$ where t is no greater than 0.9, the layer comprising zinc oxide $ZnO_t$ located between and contacting the layer comprising DLC and the layer comprising $SnO_x$;
   heat treating said coated article so that during the heat treating the protective film prevents significant burnoff of the layer comprising DLC, wherein the heat treating comprises heating the glass substrate to temperature(s) sufficient for thermal tempering, heat strengthening, and/or heat bending;

wherein during the heat treating the layer comprising $SnO_x$ transforms into a layer comprising $SnO_y$, where y is from about 1.6 to 2.2, and wherein y is greater than x; and exposing the protective film to a release liquid and removing at least part of the protective film after said heat treating.

6. The method of claim 5, further comprising quenching the glass substrate with the layer comprising DLC and the protective film thereon after said heat treating, said quenching comprising using at least cool air and/or cool liquid to quench the glass substrate.

7. The method of claim 5, wherein x is from about 0.8 to 1.3.

8. The method of claim 5, wherein x is from about 0.9 to 1.2.

9. The method of claim 5, wherein y is from about 1.7 to 2.1.

10. The method of claim 5, wherein y is from about 1.9 to 2.05.

11. The method of claim 5, wherein t is from about 0.1 to 0.8.

12. The method of claim 5, further comprising forming the layer comprising DLC via an ion beam.

13. The method of claim 5, further comprising forming the protective film via sputtering.

14. The method of claim 5, further comprising forming a barrier layer comprising silicon oxide and/or silicon nitride so as to be located between at least the glass substrate and the layer comprising DLC.

15. The method of claim 5, wherein the heat treating comprises heating the glass substrate with the layer comprising DLC and the protective film thereon using at least temperature(s) of at least 550 degrees C.

16. The method of claim 5, wherein the layer comprising DLC comprises amorphous DLC and has more $sp^3$ carbon-carbon bonds than $sp^2$ carbon-carbon bonds.

17. The method of claim 5, wherein the layer comprising DLC has an average hardness of at least 10 GPa.

18. The method of claim 5, wherein the layer comprising DLC has a density of at least about 2.7 $gm/cm^3$.

19. The method of claim 5, wherein the layer comprising DLC is hydrogenated.

20. The method of claim 5, wherein the coated article is substantially transparent and is used as a shower door.

21. The method of claim 5, wherein after said removing step at least part of the layer comprising DLC is exposed so as to be an outermost layer of the coated article.

* * * * *